(12) United States Patent
Nagashima et al.

(10) Patent No.: US 12,214,830 B2
(45) Date of Patent: Feb. 4, 2025

(54) STEERING CONTROL DEVICE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Yugo Nagashima, Anjo (JP); Yuji Fujita, Okazaki (JP); Yuuta Kajisawa, Okazaki (JP); Kazuma Hasegawa, Anjo (JP); Takashi Koudai, Okazaki (JP); Masaharu Yamashita, Toyota (JP); Yosuke Yamashita, Nagoya (JP); Shintaro Takayama, Toyota (JP); Hiroki Tomizawa, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 209 days.

(21) Appl. No.: 17/973,737

(22) Filed: Oct. 26, 2022

(65) Prior Publication Data
US 2023/0130839 A1   Apr. 27, 2023

(30) Foreign Application Priority Data
Oct. 26, 2021   (JP) ................................. 2021-174723

(51) Int. Cl.
*B62D 25/20* (2006.01)
*B62D 5/04* (2006.01)

(52) U.S. Cl.
CPC ......... *B62D 5/0463* (2013.01); *B62D 5/0409* (2013.01)

(58) Field of Classification Search
CPC .................................. B60R 25/20; B62D 5/04
See application file for complete search history.

(56) References Cited

U.S. PATENT DOCUMENTS

| | | | | |
|---|---|---|---|---|
| 5,085,061 A | * | 2/1992 | Maudsley | ............... B60R 25/09 70/279.1 |
| 6,684,146 B1 | | 1/2004 | Hedenetz | |
| 6,889,792 B1 | * | 5/2005 | Fardoun | .................. B60R 25/20 180/443 |
| 2004/0011586 A1 | * | 1/2004 | Zhao | ...................... B62D 5/006 180/402 |
| 2013/0245892 A1 | | 9/2013 | Chen et al. | |

(Continued)

FOREIGN PATENT DOCUMENTS

| | | |
|---|---|---|
| JP | 2006-321434 A | 11/2006 |
| JP | 2007-153109 A | 6/2007 |

OTHER PUBLICATIONS

Mar. 27, 2023 Search Report issued in European Patent Application No. 22203900.0.

*Primary Examiner* — Long T Tran
(74) *Attorney, Agent, or Firm* — Oliff PLC (57) ABSTRACT

A steering control device includes a control circuit configured to control driving of a reaction force motor that generates steering reaction force applied to a steering wheel in which power transmission with turning wheels of a vehicle is separated. When a vehicle power source is turned on, the control circuit requests a vehicle control device to stop traveling of the vehicle when information is exchanged with the vehicle control device in a manner that does not follow a predetermined pattern.

9 Claims, 7 Drawing Sheets

(56) References Cited

U.S. PATENT DOCUMENTS

| | | | |
|---|---|---|---|
| 2015/0134205 A1* | 5/2015 | Shibuya | B62D 6/04 |
| | | | 701/41 |
| 2015/0246683 A1 | 9/2015 | Kuramochi | |
| 2016/0221601 A1* | 8/2016 | Barthomeuf | B62D 5/0469 |
| 2016/0257285 A1* | 9/2016 | Poggi | B60R 25/02102 |
| 2018/0022375 A1* | 1/2018 | Sugishita | B62D 1/184 |
| | | | 74/493 |
| 2018/0208235 A1* | 7/2018 | Miyashita | B62D 5/003 |
| 2018/0304920 A1* | 10/2018 | Hirate | B62D 5/0463 |
| 2019/0202468 A1* | 7/2019 | Kaji | B60W 40/08 |
| 2019/0286127 A1* | 9/2019 | Watanabe | G05D 1/0061 |
| 2020/0114961 A1* | 4/2020 | Suzuki | B60Q 9/00 |
| 2020/0398891 A1 | 12/2020 | Szepessy et al. | |

* cited by examiner

STEERING CONTROL DEVICE

CROSS-REFERENCE TO RELATED APPLICATION

This application claims priority to Japanese Patent Application No. 2021-174723 filed on Oct. 26, 2021, incorporated herein by reference in its entirety.

BACKGROUND

1. Technical Field

The present disclosure relates to a steering control device.

2. Description of Related Art

There is a so-called steer-by-wire steering device in which power transmission between a steering wheel and turning wheels is separated (refer to, for example, Japanese Unexamined Patent Application Publication No. 2006-321434 (JP 2006-321434 A)). This steering device includes a reaction force mechanism having a reaction force motor that is a source of generating steering reaction force applied to a steering shaft, and a turning mechanism having a turning motor that is a source of generating turning force for turning the turning wheels. When a vehicle travels, a control device of the steering device generates the steering reaction force through electric power supply control to the reaction force motor, and turns the turning wheels through electric power supply control to the turning motor.

SUMMARY

The vehicle is requested to have higher crime prevention performance. The steering device mounted on the vehicle is also requested to have higher crime prevention performance.

A steering control device according to an aspect of the present disclosure includes a control circuit configured to control driving of a reaction force motor that generates steering reaction force applied to a steering wheel in which power transmission with turning wheels of a vehicle is separated. When a vehicle power source is turned on, the control circuit requests a vehicle control device that controls traveling of the vehicle to stop the traveling of the vehicle when information is exchanged with the vehicle control device in a manner that does not follow a predetermined pattern.

There is a concern that information exchanged between the steering control device and the vehicle control device may be falsified due to some fraudulent act. In this respect, with the above configuration, it is possible to suppress the traveling of the vehicle when the information is exchanged between the control circuit and the vehicle control device in a manner that does not follow the predetermined pattern. Therefore, crime prevention performance is enhanced.

In the above aspect, when execution of preparatory processing executed with the turn-on of the vehicle power source as a trigger is completed, the control circuit may permit the vehicle control device to cause the vehicle to transition to a travelable state and transition to a normal control state where reaction force control of causing the reaction force motor to generate the steering reaction force is executed when recognition is made via the vehicle control device that the vehicle is in the travelable state.

With the above configuration, when the preparatory processing for the reaction force control is completed, the steering control device permits the vehicle control device to cause the vehicle to transition to the travelable state. That is, the vehicle control device waits until the steering control device permits the vehicle to transition to the travelable state and then causes the vehicle to transition to the travelable state. For this reason, the vehicle can solely travel after the preparatory processing of the steering control device is completed. Therefore, it is possible for the driver to start the traveling of the vehicle in a safer state.

In the above configuration, when the recognition is made via the vehicle control device that the vehicle is in the travelable state even though the vehicle control device is not permitted to cause the vehicle to transition to the travelable state, the control circuit may request the vehicle control device to stop the traveling of the vehicle.

When the recognition is made that the vehicle is in the travelable state even though the steering control device does not permit the vehicle control device to transition the vehicle to the travelable state, the permission to the vehicle control device may be falsified due to a fraudulent act such as impersonation. In this respect, with the above configuration, when the permission to the vehicle control device may be falsified, the vehicle control device is requested to stop the traveling of the vehicle. With the stop of the traveling of the vehicle by the vehicle control device in response to the request from the steering control device, the crime prevention performance is enhanced.

In the above configuration, the preparatory processing may include, on a premise that a steering range of the steering wheel is restricted to less than 360°, midpoint learning processing of operating the steering wheel to a first operation end and then reversely operating the steering wheel to a second operation end for learning of a steering neutral position of the steering wheel and rudder angle synchronization processing of correcting a rotational position of the steering wheel such that the rotational position of the steering wheel is a rotational position corresponding to a turning position of the turning wheels.

For example, when the vehicle starts to travel even though the steering control device is in the middle of executing the midpoint learning processing or the rudder angle synchronization processing, a driver may have difficulty in steering the steering wheel in an intended steering direction. This is because the steering wheel is in an automatically rotating state during the execution of the midpoint learning processing or during the execution of the rudder angle synchronization processing. In this respect, with the above configuration, when the preparatory processing for the reaction force control is completed, the steering control device permits the vehicle control device to cause the vehicle to transition to the travelable state. For this reason, the vehicle can solely travel after the preparatory processing of the steering control device is completed. Therefore, it is possible for the driver to start the traveling of the vehicle in a safer state. There is no sense of discomfort for the driver.

In the above aspect, the vehicle control device may control a start of a powertrain including a drive source for traveling of the vehicle. With the above configuration, with the control of the start of the powertrain of the vehicle through the vehicle control device, it is possible to cause the vehicle to transition to the travelable state.

With the steering control device of the aspect described above, the crime prevention performance can be further enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
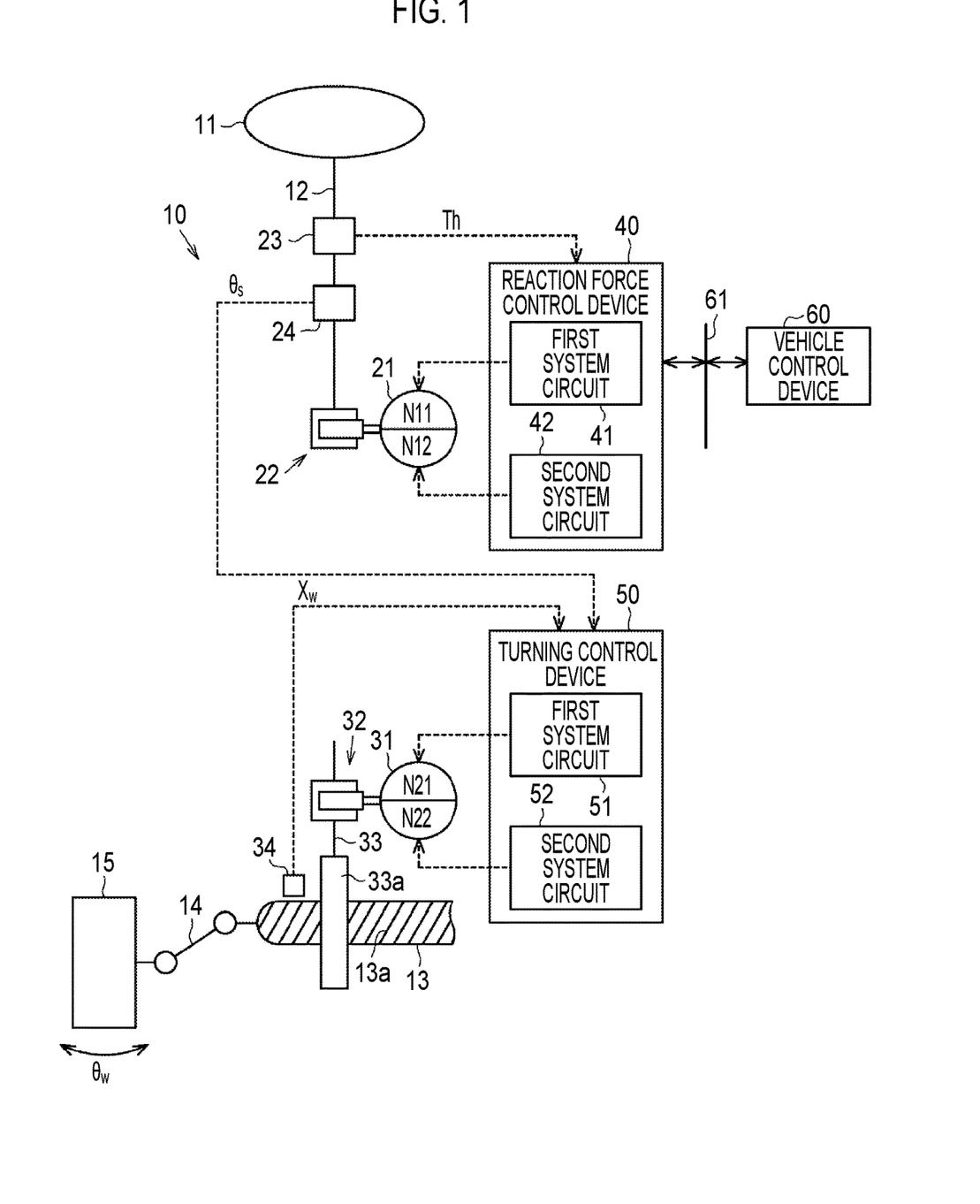
FIG. 1 is a configuration diagram of a steer-by-wire steering device equipped with an embodiment of a steering control device.

A first embodiment in which a steering control device is embodied as a steer-by-wire steering device will be described below. As shown in FIG. 1, a steering device 10 of a vehicle has a steering shaft 12 connected to a steering wheel 11. The steering device 10 also has a turning shaft 13 extending along a vehicle width direction (right and left direction in FIG. 1). Both ends of the turning shaft 13 are respectively connected to turning wheels 15 via tie rods 14. With linear movement of the turning shaft 13, a turning angle $\theta_w$ of the turning wheels 15 is changed. The steering shaft 12 and the turning shaft 13 constitute a steering mechanism of the vehicle. FIG. 1 illustrates solely the turning wheels 15 on one side.

The steering device 10 has a reaction force motor 21 and a speed reduction mechanism 22. The reaction force motor 21 is a source of generating steering reaction force. The steering reaction force is force that acts in a direction opposite to a direction in which the steering wheel 11 is operated by a driver. A rotation shaft of the reaction force motor 21 is connected to the steering shaft 12 via the speed reduction mechanism 22. A torque of the reaction force motor 21 is applied to the steering shaft 12 as the steering reaction force. With the steering reaction force applied to the steering wheel 11, an appropriate feeling of response can be given to the driver.

The reaction force motor 21 is, for example, a three-phase brushless motor. The reaction force motor 21 has a winding group N11 of a first system and a winding group N12 of a second system. The winding group N11 of the first system and the winding group N12 of the second system are wound around a common stator (not shown). Electrical characteristics of the winding group N11 of the first system and the winding group N12 of the second system are the same.

The steering device 10 has a turning motor 31 and a speed reduction mechanism 32. The turning motor 31 is a source of generating turning force. The turning force is power for turning the turning wheels 15. A rotation shaft of the turning motor 31 is connected to a pinion shaft 33 via the speed reduction mechanism 32. Pinion teeth 33a of the pinion shaft 33 are engaged with rack teeth of the turning shaft 13. A torque of the turning motor 31 is applied to the turning shaft 13 via the pinion shaft 33 as the turning force. As the turning motor 31 rotates, the turning shaft 13 moves along the vehicle width direction.

The turning motor 31 is, for example, a three-phase brushless motor. The turning motor 31 has a winding group N21 of a first system and a winding group N22 of a second system. The winding group N21 of the first system and the winding group N22 of the second system are wound around a common stator (not shown). Electrical characteristics of the winding group N21 of the first system and the winding group N22 of the second system are the same.

The steering device 10 has a reaction force control device 40. The reaction force control device 40 controls driving of the reaction force motor 21, which is a control target. The reaction force control device 40 executes reaction force control to cause the reaction force motor 21 to generate the steering reaction force according to a steering torque Th. The reaction force control device 40 calculates a target steering reaction force based on the steering torque Th detected by a torque sensor 23. The torque sensor 23 is provided on the steering shaft 12. The reaction force control device 40 controls electric power supply to the reaction force motor 21 to match actual steering reaction force applied to the steering shaft 12 with the target steering reaction force. The reaction force control device 40 independently controls the electric power supply to the winding groups of the two systems in the reaction force motor 21 for each system.

The reaction force control device 40 has a first system circuit 41 and a second system circuit 42. The first system circuit 41 controls the electric power supply to the winding group N11 of the first system in the reaction force motor 21 according to the steering torque Th detected by the torque sensor 23. The second system circuit 42 controls the electric power supply to the winding group N12 of the second system in the reaction force motor 21 according to the steering torque Th detected by the torque sensor 23.

The reaction force control device 40 and the in-vehicle vehicle control device 60 are interconnected via an in-vehicle network 61. The in-vehicle network 61 is, for example, a controller area network (CAN). The reaction force control device 40 and the in-vehicle vehicle control device 60 exchange information with each other via the in-vehicle network 61. The vehicle control device 60 controls traveling of the vehicle. Specifically, the vehicle control device 60 controls, for example, a powertrain of the vehicle. The powertrain includes a drive source for traveling of the vehicle and a power transmission mechanism. The drive source for traveling includes, for example, an engine or a motor. The power transmission mechanism is a mechanism that transmits the power generated by the drive source for traveling to drive wheels. The reaction force control device 40 controls the driving of the reaction force motor 21 based on the information exchanged with the vehicle control device 60.

The steering device 10 has a turning control device 50. The turning control device 50 controls driving of the turning motor 31, which is a control target. The turning control device 50 executes turning control to cause the turning motor 31 to generate the turning force for turning the turning wheels 15 according to a steering state. The turning control device 50 takes in a steering angle $\theta_s$ detected by a steering angle sensor 24 and a stroke Xw of the turning shaft 13 detected by a stroke sensor 34. The stroke Xw is a displacement amount of the turning shaft 13 with a neutral position as a reference and is a state variable that reflects the turning angle $\theta_w$. The steering angle sensor 24 is provided between the torque sensor 23 of the steering shaft 12 and the speed reduction mechanism 22. The stroke sensor 34 is provided near the turning shaft 13.

The turning control device 50 calculates a target turning angle of the turning wheels 15 based on the steering angle $θ_s$ detected by the steering angle sensor 24. The turning control device 50 calculates the turning angle $θ_w$ based on the stroke Xw of the turning shaft 13 detected by the stroke sensor 34. The turning control device 50 controls the electric power supply to the turning motor 31 to match the turning angle $θ_w$ calculated based on the stroke Xw with the target turning angle. The turning control device 50 independently controls the electric power supply to the winding groups of the two systems in the turning motor 31 for each system.

The turning control device 50 has a first system circuit 51 and a second system circuit 52. The first system circuit 51 controls the electric power supply to the winding group N21 of the first system in the turning motor 31 based on the steering angle $θ_s$ detected by the steering angle sensor 24 and the stroke Xw of the turning shaft 13 detected by the stroke sensor 34. The second system circuit 52 controls the electric power supply to the winding group N22 of the second system in the turning motor 31 based on the steering angle $θ_s$ detected by the steering angle sensor 24 and the stroke Xw of the turning shaft 13 detected by the stroke sensor 34.

With integral provision of the reaction force control device 40 and the reaction force motor 21, a so-called electromechanical integrated reaction force actuator may be configured. Further, with integral provision of the turning control device 50 and the turning motor 31, a so-called electromechanically integrated turning actuator may be configured. The reaction force control device 40 and the turning control device 50 constitute a steering control device.

Reaction Force Control Device

Figure 2:
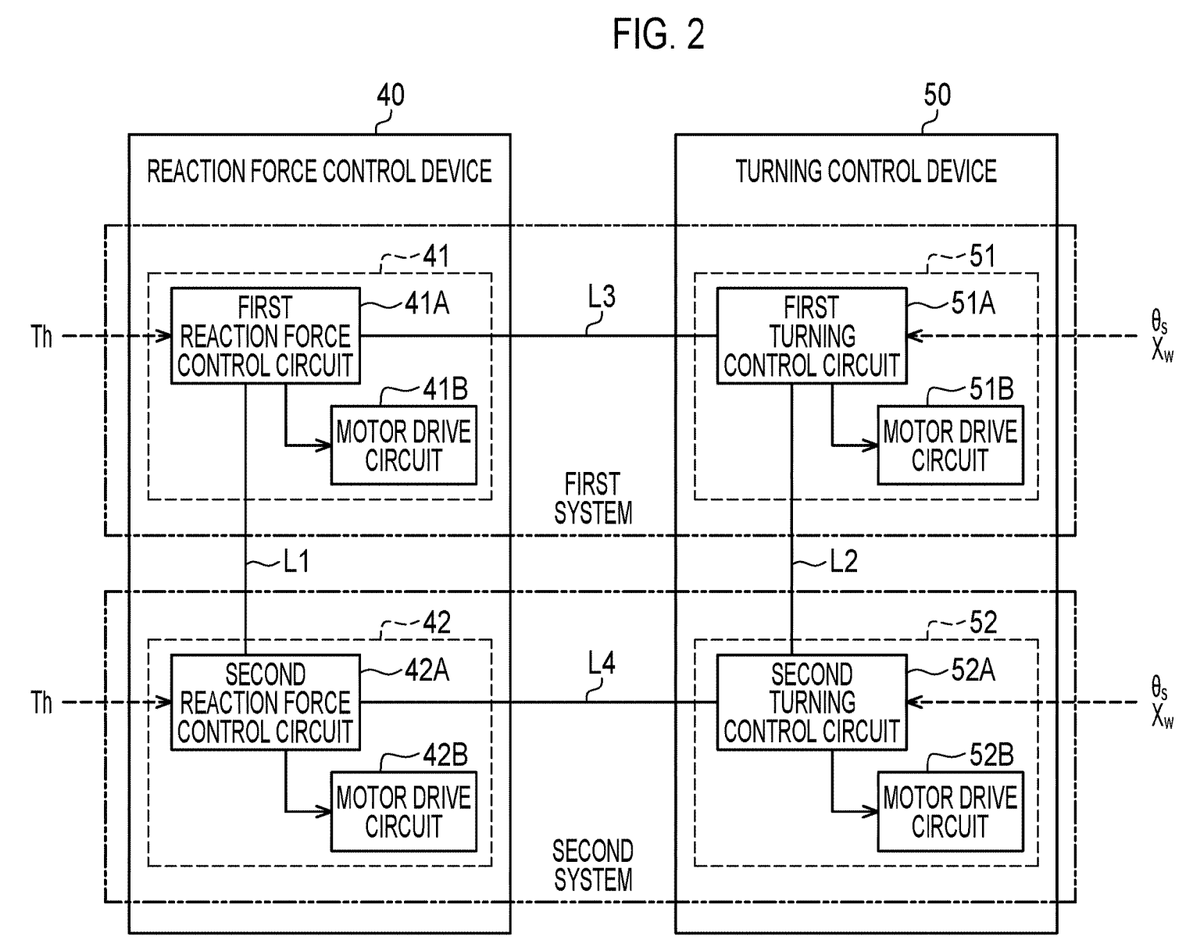
FIG. 2 is a block diagram of a reaction force control device and a turning control device according to an embodiment.

Next, a configuration of the reaction force control device will be described in detail. As shown in FIG. 2, the reaction force control device 40 has the first system circuit 41 and the second system circuit 42. The first system circuit 41 has a first reaction force control circuit 41A and a motor drive circuit 41B. The second system circuit 42 has a second reaction force control circuit 42A and a motor drive circuit 42B.

The first reaction force control circuit 41A is configured of a processing circuit including 1. one or more processors that operate in accordance with a computer program (software), 2. one or more dedicated hardware circuits, such as an application-specific integrated circuit (ASIC), that execute at least some of various types of processing, and 3. a combination thereof. The processor includes a central processing unit (CPU). The processor also includes memories, such as a random-access memory (RAM) and a read-only memory (ROM). The memory stores a program code or a command configured to cause the CPU to execute the processing. The memory, that is, non-transitory computer-readable medium includes any available medium that can be accessed by a general-purpose or dedicated computer.

The first reaction force control circuit 41A calculates the target steering reaction force to be generated in the reaction force motor 21 based on the steering torque Th detected by the torque sensor 23, and calculates a first current command value for the winding group N11 of the first system according to a value of the calculated target steering reaction force. However, the first current command value is set to a value of half (50%) of a current amount (100%) requested to cause the reaction force motor 21 to generate the target steering reaction force. The first reaction force control circuit 41A executes current feedback control in which a value of an actual current supplied to the winding group N11 of the first system follows the first current command value to generate a drive signal (PWM signal) for the motor drive circuit 41B.

The motor drive circuit 41B is a PWM inverter in which three legs respectively corresponding to three phases (U,V, W), with switching elements such as two field effect transistors (FETs) connected in series as a leg that is a basic unit, are connected in parallel. The motor drive circuit 41B switches the switching elements of each phase based on the drive signal generated by the first reaction force control circuit 41A to convert direct-current electric power supplied from a battery into three-phase alternating-current electric power. The three-phase alternating-current electric power generated by the motor drive circuit 41B is supplied to the winding group N11 of the first system of the reaction force motor 21 via an electric power supply path for each phase, such as a bus bar or a cable. Accordingly, the winding group N11 of the first system generates a torque according to the first current command value.

The second reaction force control circuit 42A basically has the same configuration as the first reaction force control circuit 41A. The second reaction force control circuit 42A calculates the target steering reaction force to be generated in the reaction force motor 21 based on the steering torque Th detected by the torque sensor 23, and calculates a second current command value for the winding group N12 of the second system according to the value of the calculated target steering reaction force. However, the second current command value is set to the value of half (50%) of the current amount requested to cause the reaction force motor 21 to generate the target steering reaction force. The second reaction force control circuit 42A executes current feedback control in which a value of an actual current supplied to the winding group N12 of the second system follows the second current command value to generate a drive signal for the motor drive circuit 42B.

The motor drive circuit 42B basically has the same configuration as the motor drive circuit 41B. The motor drive circuit 42B converts the direct-current electric power supplied from the battery into the three-phase alternating-current electric power based on the drive signal generated by the second reaction force control circuit 42A. The three-phase alternating-current electric power generated by the motor drive circuit 42B is supplied to the winding group N12 of the second system of the reaction force motor 21 via the electric power supply path for each phase, such as a bus bar or a cable. Accordingly, the winding group N12 of the second system generates a torque according to the second current command value. The reaction force motor 21 generates a total torque of the torque generated by the winding group N11 of the first system and the torque generated by the winding group N12 of the second system.

Depending on product specifications, there may be a master-slave relationship between the first system circuit 41 and the second system circuit 42 of the reaction force control device 40. In this case, for example, the first system circuit 41 may function as a master, and the second system circuit 42 may function as a slave. Further, depending on product specifications, the first system circuit 41 and the second system circuit 42 may have an equal relationship.

Turning Control Device

Next, a configuration of the turning control device 50 will be described in detail. As shown in FIG. 2, the turning control device 50 has the first system circuit 51 and the second system circuit 52. The first system circuit 51 has a first turning control circuit 51A and a motor drive circuit 51B. The second system circuit 52 has a second turning control circuit 52A and a motor drive circuit 52B.

The first turning control circuit 51A basically has the same configuration as the first reaction force control circuit 41A. The first turning control circuit 51A calculates the target turning angle of the turning wheels 15 based on the steering angle $\theta_s$ detected by the steering angle sensor 24. The turning control device 50 calculates the turning angle $\theta_w$ based on the stroke Xw of the turning shaft 13 detected by the stroke sensor 34. The first turning control circuit 51A calculates a target turning force to be generated in the turning motor 31 through execution of angle feedback control in which the turning angle $\theta_w$ calculated based on the stroke Xw follows a target turning angle, and calculates a third current command value for the winding group N21 of the first system of the turning motor 31 according to a value of the calculated target turning force. However, the third current command value is set to a value of half (50%) of a current amount requested to cause the turning motor 31 to generate the target turning force. The first turning control circuit 51A executes current feedback control in which a value of an actual current supplied to the winding group N21 of the first system follows the third current command value to generate a drive signal for the motor drive circuit 51B.

The motor drive circuit 51B basically has the same configuration as the motor drive circuit 41B. The motor drive circuit 51B converts the direct-current electric power supplied from the battery into the three-phase alternating-current electric power based on the drive signal generated by the first turning control circuit 51A. The three-phase alternating-current electric power generated by the motor drive circuit 51B is supplied to the winding group N21 of the first system of the turning motor 31 via the electric power supply path for each phase, such as a bus bar or a cable. Accordingly, the winding group N21 of the first system generates a torque according to the third current command value.

The second turning control circuit 52A basically has the same configuration as the first reaction force control circuit 41A. The second turning control circuit 52A calculates the target turning angle of the turning wheels 15 based on the steering angle $\theta_s$ detected by the steering angle sensor 24. The turning control device 50 calculates the turning angle $\theta_w$ based on the stroke Xw of the turning shaft 13 detected by the stroke sensor 34. The second turning control circuit 52A calculates the target turning force to be generated in the turning motor 31 through the execution of angle feedback control in which the turning angle $\theta_w$ calculated based on the stroke Xw follows a target turning angle, and calculates a fourth current command value for the winding group N22 of the second system of the turning motor 31 according to a value of the calculated target turning force. However, the fourth current command value is set to the value of half (50%) of the current amount requested to cause the turning motor 31 to generate the target turning force. The second turning control circuit 52A executes current feedback control in which a value of an actual current supplied to the winding group N22 of the second system follows the fourth current command value to generate a drive signal for the motor drive circuit 52B.

The motor drive circuit 52B basically has the same configuration as the motor drive circuit 41B. The motor drive circuit 52B converts the direct-current electric power supplied from the battery into the three-phase alternating-current electric power based on the drive signal generated by the second turning control circuit 52A. The three-phase alternating-current electric power generated by the motor drive circuit 52B is supplied to the winding group N22 of the second system of the turning motor 31 via the electric power supply path for each phase, such as a bus bar or a cable. Accordingly, the winding group N22 of the second system generates a torque according to the fourth current command value. The turning motor 31 generates a total torque of the torque generated by the winding group N21 of the first system and the torque generated by the winding group N22 of the second system.

Depending on product specifications, there may be a master-slave relationship between the first system circuit 51 and the second system circuit 52 of the turning control device 50. In this case, for example, the first system circuit 51 may function as a master and the second system circuit 52 may function as a slave. Further, depending on product specifications, the first system circuit 51 and the second system circuit 52 may have an equal relationship.

Communication Path

Next, communication paths inside the reaction force control device 40 and the turning control device 50 and communication paths between the reaction force control device 40 and the turning control device 50 will be described.

As shown in FIG. 2, the first reaction force control circuit 41A and the second reaction force control circuit 42A exchange information with each other via a communication line L1. The information includes abnormality information of the first reaction force control circuit 41A and the second reaction force control circuit 42A or the motor drive circuits 41B, 42B. The information also includes flag values indicating various states. The first reaction force control circuit 41A and the second reaction force control circuit 42A cooperate to control the driving of the reaction force motor 21 based on the information exchanged with each other.

The first turning control circuit 51A and the second turning control circuit 52A exchange information with each other via a communication line L2. The information includes abnormality information of the first turning control circuit 51A and the second turning control circuit 52A or the motor drive circuits 51B, 52B. The information also includes flag values indicating various states. The first turning control circuit 51A and the second turning control circuit 52A cooperate to control the driving of the turning motor 31 based on the information exchanged with each other.

The first reaction force control circuit 41A and the first turning control circuit 51A exchange information with each other via a communication line L3. The information includes abnormality information of the first reaction force control circuit 41A, the first turning control circuit 51A, and the motor drive circuits 41B, 51B. The information also includes flag values indicating various states. The first reaction force control circuit 41A and the first turning control circuit 51A operate in cooperation based on the information exchanged with each other.

The second reaction force control circuit 42A and the second turning control circuit 52A exchange information with each other via a communication line L4. The information includes abnormality information of the second reaction force control circuit 42A and the second turning control circuit 52A or the motor drive circuits 42B, 52B. The information also includes flag values indicating various states. The second reaction force control circuit 42A and the second turning control circuit 52A operate in cooperation based on the information exchanged with each other.

Comparative Example of Activation Sequence

Figure 3:
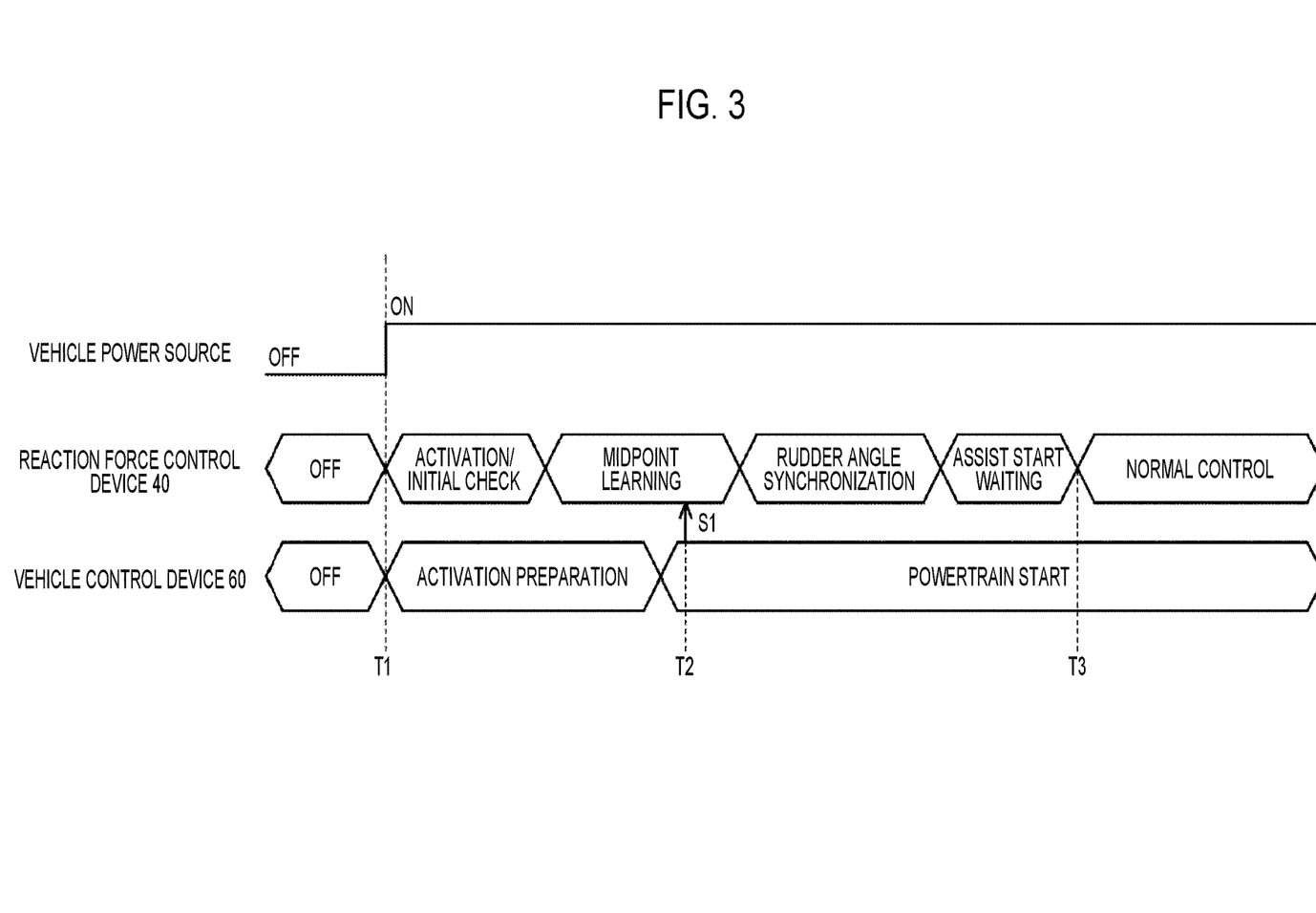
FIG. 3 is a time chart showing a comparative example of activation sequences in the reaction force control device and a vehicle control device.

Next, a comparative example of activation sequences of the reaction force control device 40 and the vehicle control device 60 will be described. The activation sequence is a series of pieces of processing executed with turn-on of a vehicle power source as a trigger. During a period when the vehicle power source is turned off, the reaction force control device 40 and the vehicle control device 60 are maintained in an inoperative state. The turn-on or turn-off of the vehicle power source also means turn-on or turn-off of an activation switch provided in the driver's seat, for example. The activation switch is operated when the drive source for traveling of the vehicle is started or stopped, and is, for example, an ignition switch or a power switch.

First, the comparative example of the activation sequence of the vehicle control device 60 will be described. As shown in a time chart of FIG. 3, when the vehicle power source is turned on (time point T1), the vehicle control device 60 starts execution of predetermined activation preparation. The activation preparation includes an initial check by the vehicle control device 60 and processing requested to start the powertrain of the vehicle. The vehicle control device 60 starts the powertrain (mainly drive source for traveling) after the activation preparation is completed. The vehicle control device 60 turns on a preparation completion signal S1 when the execution of the powertrain start processing is completed (time point T2). The vehicle control device 60 turns on the preparation completion signal S1 regardless of the state of the reaction force control device 40.

The preparation completion signal S1 is information indicating whether or not preparation for the traveling of the vehicle is completed, including the completion of execution of the powertrain start processing, and the vehicle is in a travelable state. The fact that the preparation completion signal S1 is turned on indicates that the vehicle is in the travelable state. The fact that the preparation completion signal S1 is turned off indicates that the vehicle is not in the travelable state. The preparation completion signal S1 is transmitted to the reaction force control device 40 as an electric signal.

Next, a comparative example of the activation sequence of the reaction force control device 40 will be described. As shown in the time chart of FIG. 3, when the vehicle power source is turned on (time point T1), the reaction force control device 40 is activated, sequentially executes the initial check, midpoint learning processing, and rudder angle synchronization processing, and then transitions to an assist start waiting state. The initial check, the midpoint learning processing, and the rudder angle synchronization processing are a series of pieces of preparatory processing requested to start the execution of the reaction force control that causes the reaction force motor 21 to generate the steering reaction force.

The initial check is an initial inspection that is executed with the turn-on of the vehicle power source as a trigger, and includes, for example, a hardware check, central processing unit (CPU) initialization, and initialization of a variable or a flag.

The midpoint learning processing is processing for learning a steering neutral position of the steering wheel 11. The steering device 10 has a stopper mechanism that restricts the rotation of the steering wheel 11 in order to limit the steering angle of the steering wheel 11. The stopper mechanism restricts a steering range of the steering wheel 11 to less than 360°, for example. The reaction force control device 40 controls the reaction force motor 21 to operate the steering wheel 11 to a first operation end and then to reversely operate the steering wheel 11 to a second operation end. Thereafter, the reaction force control device 40 calculates a midpoint of the steering angle based on rotation angles of the reaction force motor 21 at a start point in time and an end point in time of the reverse operation of the steering wheel 11. The midpoint of the steering angle corresponds to a motor midpoint that is a rotational position of the reaction force motor 21 when the steering wheel 11 is positioned at the steering neutral position. The reaction force control device 40 stores the midpoint of the steering angle or the motor midpoint as the steering neutral position of the steering wheel 11.

However, the reaction force control device 40 learns the steering neutral position of the steering wheel 11 when a new battery is attached and then the vehicle power source is turned on for the first time. This is because information related to the steering neutral position stored in the reaction force control device 40 disappears due to the fact that the electric power is not supplied to the reaction force control device 40 when the battery is removed from the vehicle for battery replacement work, for example.

The rudder angle synchronization processing is processing of correcting a rotational position of the steering wheel 11. When the rotational position of the steering wheel 11 is different from a rotational position corresponding to a turning position of the turning wheels 15, the reaction force control device 40 drives the reaction force motor 21 such that the rotational position of the steering wheel 11 is the rotational position corresponding to the turning position of the turning wheels 15.

The assist start waiting state is a state of waiting for confirmation of the completion of the execution of the powertrain start processing by the vehicle control device 60 after the execution of the preparatory processing is completed. The reaction force control device 40 determines whether or not transition from the assist start waiting state to the normal control state is possible according to the start state of the powertrain of the vehicle. When the preparation completion signal S1 is not turned on by the vehicle control device 60, the reaction force control device 40 determines that the execution of the start processing of the powertrain of the vehicle has not been completed and maintains the assist start waiting state. When the preparation completion signal S1 is turned on by the vehicle control device 60, the reaction force control device 40 determines that the execution of the start processing of the powertrain of the vehicle has been completed (time point T3) and transitions from the assist start waiting state to the normal control state. The normal control state is a state where the reaction force control of causing the reaction force motor 21 to generate the steering reaction force is executed. The reaction force control device 40 controls the driving of the reaction force motor 21 according to the steering state of the steering wheel 11 in the normal control state.

In the time chart of FIG. 3, the vehicle control device 60 turns on the preparation completion signal S1 during the execution of the midpoint learning processing, as an example. However, when the vehicle is in the travelable state regardless of the state of the reaction force control device 40, the vehicle can travel even though the reaction force control device 40 is in the middle of executing the preparatory processing. In this case, there are concerns about the following.

For example, when the vehicle starts to travel even though the reaction force control device 40 is in the middle of executing the midpoint learning processing, the driver may have difficulty in steering the steering wheel 11 in an intended steering direction. This is because the steering wheel 11 is in an automatically rotating state during the execution of the midpoint learning processing.

When the vehicle starts to travel even though the reaction force control device 40 is in the middle of executing the rudder angle synchronization processing, the driver may have difficulty in steering the steering wheel 11 in an intended steering direction. This is because the steering wheel 11 is in an automatically rotating state during the execution of the rudder angle synchronization processing. This is also because the rotational position of the steering wheel 11 is different from an original rotational position corresponding to the turning position of the turning wheels 15 during the execution of the rudder angle synchronization processing. Thus, the reaction force control device 40 is configured to execute the following processing.

Start Permission Determination Processing

Figure 4:
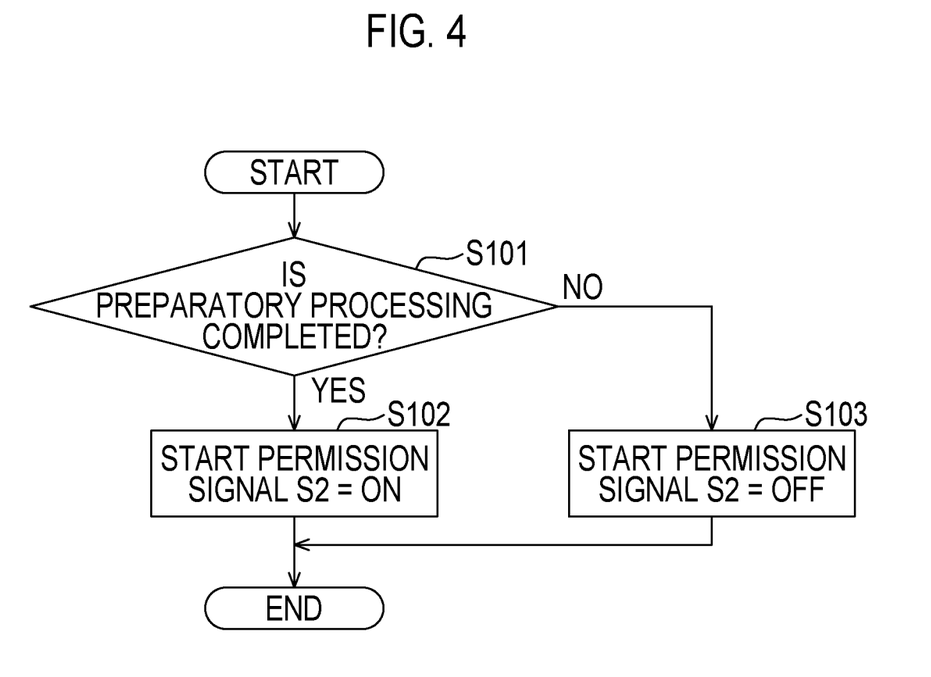
FIG. 4 is a flowchart showing a processing procedure of start permission determination for a powertrain of a vehicle by the reaction force control device according to an embodiment.

The reaction force control device 40 executes start permission determination processing with the turn-on of the vehicle power source as a trigger. The start permission determination processing is processing of determining whether or not to permit the vehicle control device 60 to start the powertrain. The start permission determination processing is executed at a predetermined control cycle according to a program stored in the reaction force control device 40.

As shown in a flowchart of FIG. 4, the reaction force control device 40 determines whether or not the preparatory processing for the reaction force control is completed (step S101). The preparatory processing is processing for preparation requested to start the execution of the reaction force control and includes the initial check, the midpoint learning processing, and the rudder angle synchronization processing.

When the preparatory processing is determined to be completed (YES in step S101), the reaction force control device 40 turns on a start permission signal S2 (step S102) and ends the processing. When the preparatory processing is determined to be not completed (NO in step S101), the reaction force control device 40 turns off the start permission signal S2 (step S103) and ends the processing.

The start permission signal S2 is information indicating whether or not to permit the vehicle control device 60 to start the powertrain. The fact that the start permission signal S2 is turned on indicates that the vehicle control device 60 is permitted to start the powertrain. The fact that the start permission signal S2 is turned off indicates that the vehicle control device 60 is not permitted to start the powertrain. The start permission signal S2 is transmitted to vehicle control device 60 as an electric signal.

First Pattern of Activation Sequence

Next, a first pattern of the activation sequence will be described. As shown in a time chart of FIG. 5, when the vehicle power source is turned on (time point T1), the reaction force control device 40 is activated to sequentially execute the initial check, the midpoint learning processing, and the rudder angle synchronization processing. When the preparatory processing including the initial check, the midpoint learning processing, and the rudder angle synchronization processing is completed, the reaction force control device 40 transitions to the assist start waiting state and turns on the start permission signal S2. The assist start waiting state is a state where the preparation for the reaction force control is ready and transition to the normal control state is possible.

Figure 5:
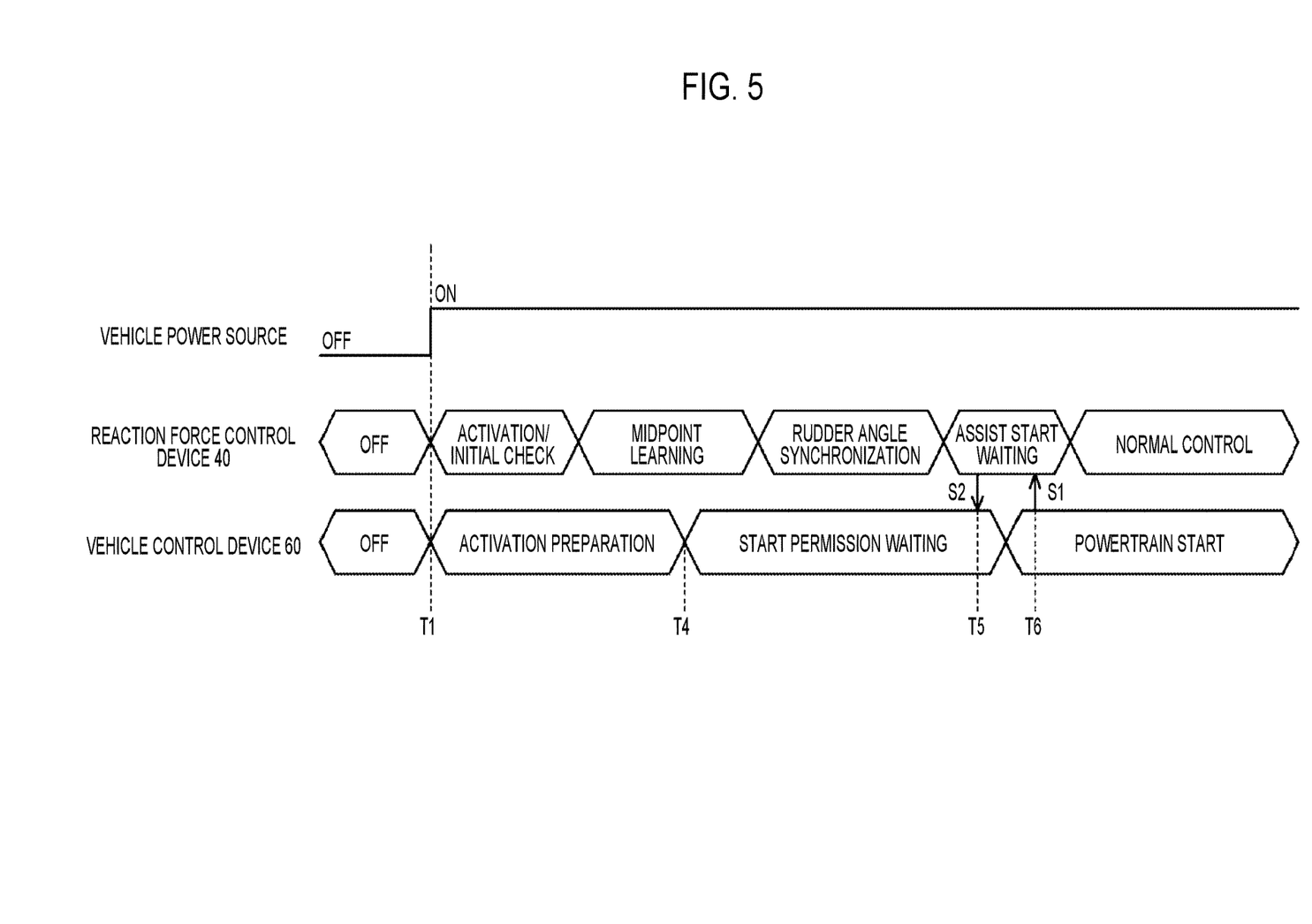
FIG. 5 is a time chart showing a first pattern of the activation sequences in the reaction force control device and the vehicle control device according to an embodiment.

When the vehicle power source is turned on (time point T1), the vehicle control device 60 starts the execution of the predetermined activation preparation. The vehicle control device 60 transitions to the start permission waiting state after the activation preparation is completed (time point T4). The start permission waiting state is a state of waiting for the reaction force control device 40 to permit the powertrain to start, that is, for the turn-on of the start permission signal S2.

When the fact that the start permission signal S2 is turned on in the start permission waiting state is recognized (time point T5), the vehicle control device 60 starts the powertrain of the vehicle. When the execution of the powertrain start processing is completed, the vehicle control device 60 turns on the preparation completion signal S1.

When the fact that the preparation completion signal S1 is turned on in the assist start waiting state is recognized (time point T6), the reaction force control device 40 transitions to the normal control state (time point T8). The reaction force control device 40 controls the driving of the reaction force motor 21 according to the steering state of the steering wheel 11.

In this manner, even when the activation preparation of the vehicle control device 60 is completed, the vehicle control device 60 waits until the preparatory processing is completed when the preparatory processing for the reaction force control by the reaction force control device 40 is not completed and starts the powertrain of the vehicle. For this reason, the vehicle can solely travel after the reaction force control device 40 transitions to the assist start waiting state where the reaction force control is executable. Therefore, the vehicle is avoided to be in the travelable state even though the reaction force control device 40 is in the middle of executing the preparatory processing. Further, the vehicle can be started to travel in a safer state for the driver, that is, in a state where the vehicle can be turned in the direction intended by the driver.

Impersonation Measures

In the first pattern of the activation sequence, there are concerns about the following. That is, there is a concern that a third party impersonating the reaction force control device 40 or the vehicle control device 60 falsifies turn-on of the start permission signal S2 by the reaction force control device 40 or turn-on of the preparation completion signal S1 by the vehicle control device 60. In this case, the vehicle may transition to the travelable state before the reaction force control device 40 transitions to the assist start waiting state where the reaction force control is executable. Thus, the reaction force control device 40 is configured to execute the following processing.

Stop Request Determination Processing for Vehicle

Figure 6:
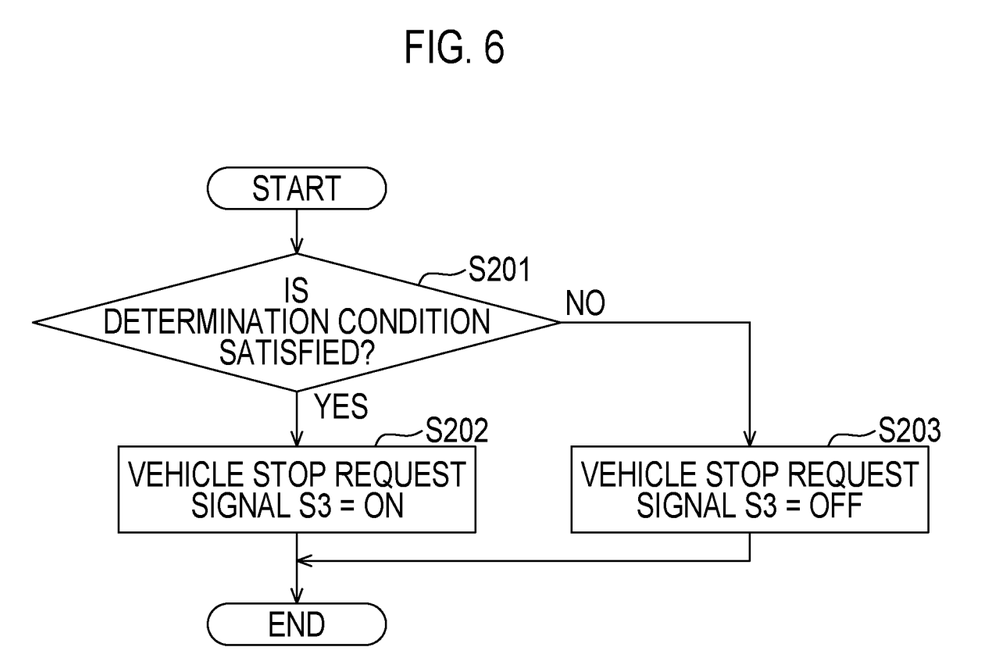
FIG. 6 is a flowchart showing a processing procedure of vehicle stop request determination by the reaction force control device according to an embodiment.

The reaction force control device 40 executes stop request determination processing for the vehicle with the turn-on of the vehicle power source as a trigger. The stop request determination processing is processing of determining whether or not there is a need to request the vehicle control device 60 to stop the start of the powertrain of the vehicle. The stop request determination processing is executed at a predetermined control cycle according to a program stored in the reaction force control device 40.

As shown in a flowchart of FIG. 6, the reaction force control device 40 determines whether or not there is a need to request the vehicle control device 60 to stop the start of the powertrain of the vehicle (step S201).

The reaction force control device 40 determines whether or not there is a need to request the vehicle control device 60 to stop the start of the powertrain of the vehicle, based on whether or not a predetermined determination condition is satisfied. The determination condition is a condition for determining whether the turn-on of the start permission signal S2 by the reaction force control device 40 or the turn-on of the preparation completion signal S1 by the vehicle control device 60 is falsified.

The determination condition includes, for example, the following two conditions A1, A2. When both of the two conditions A1, A2 are satisfied, the reaction force control device 40 determines that there is a need to request the vehicle control device 60 to stop the start of the powertrain of the vehicle. Further, when any one of the two conditions A1, A2 is not satisfied, the reaction force control device 40 determines that there is no need to request the vehicle control device 60 to stop the start of the powertrain of the vehicle.

A1. The start permission signal S2 is turned off. A2. The preparation completion signal S1 is turned on. The determination conditions are set based on the following viewpoints. That is, for example, when the vehicle control device 60 turns on the preparation completion signal S1 even though the reaction force control device 40 does not turn on the start permission signal S2, the third party impersonating the reaction force control device 40 may falsify the turn-on of the start permission signal S2.

When determination is made that there is a need to request the vehicle control device 60 to stop the start of the powertrain of the vehicle (YES in step S201), the reaction force control device 40 turns on a vehicle stop request signal S3 (step S202) and ends the processing.

When determination is made that there is no need to request the vehicle control device 60 to stop the start of the powertrain of the vehicle (NO in step S201), the reaction force control device 40 turns off the vehicle stop request signal S3 (step S203) and ends the processing.

The vehicle stop request signal S3 is information indicating whether or not to request the vehicle control device 60 to stop the operation of the powertrain. The fact that the vehicle stop request signal S3 is turned on indicates that the vehicle control device 60 is requested to stop the operation of the powertrain. The fact that the vehicle stop request signal S3 is turned off indicates that the vehicle control device 60 is not requested to stop the operation of the powertrain. The vehicle stop request signal S3 is transmitted to the vehicle control device 60 as an electric signal.

Second Pattern of Activation Sequence

Figure 7:
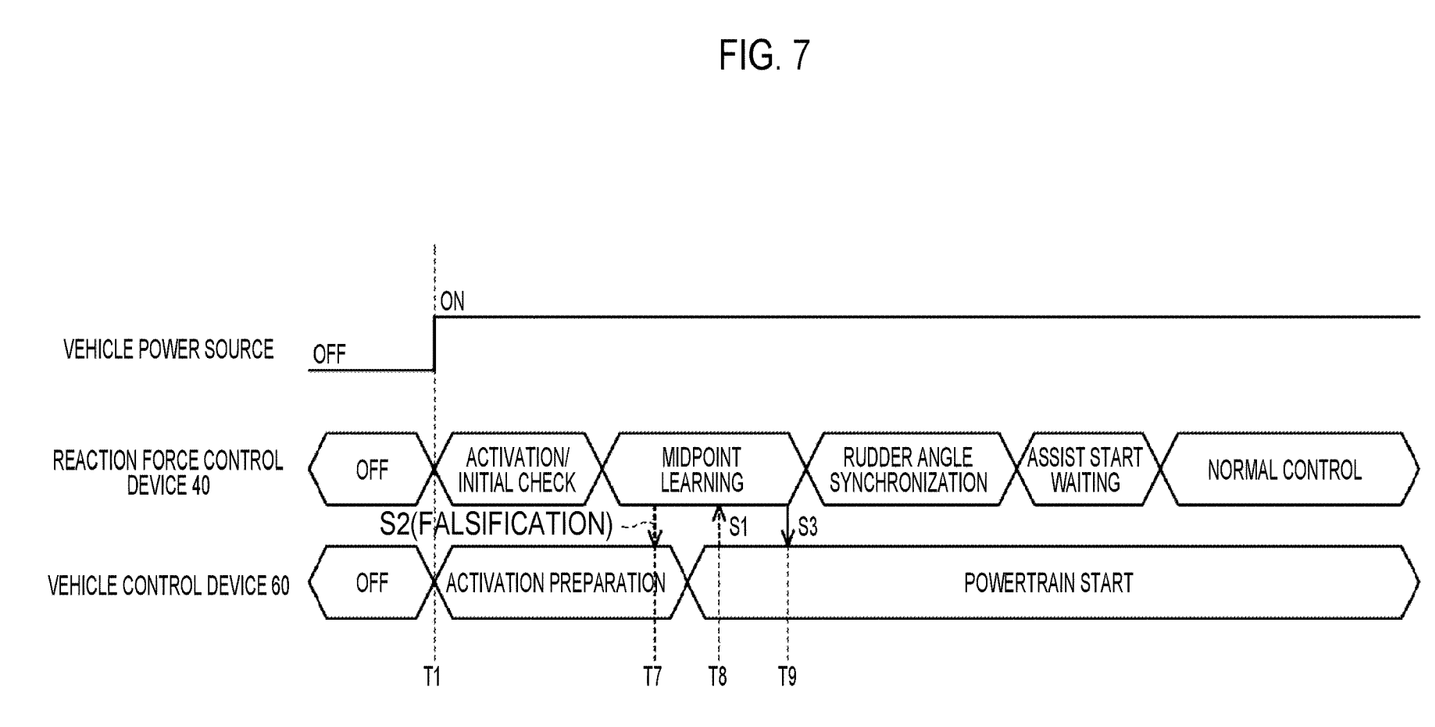
FIG. 7 is a time chart showing a second pattern of the activation sequences in the reaction force control device and the vehicle control device according to an embodiment.

Next, a second pattern of the activation sequence will be described. As an example, a case is examined in which the turn-on of the start permission signal S2 is falsified in the middle of executing the midpoint learning processing, which is one of pieces of the preparatory processing by the reaction force control device 40. Further, the preparation for activating the vehicle control device 60 is completed before the midpoint learning processing by the reaction force control device 40 is completed.

As shown in a time chart of FIG. 7, when the vehicle power source is turned on (time point T1), the reaction force control device 40 is activated to start the execution of the initial check. After the initial check is normally completed, the reaction force control device 40 starts the execution of the midpoint learning processing. For example, when the turn-on of the start permission signal S2 is falsified in the middle of executing this midpoint learning processing (time point T7), the vehicle control device 60 recognizes that the start permission signal S2 has already been turned on, for example, at a timing when the activation preparation is completed. Therefore, after the activation preparation is completed, the vehicle control device 60 immediately starts the powertrain of the vehicle without transitioning to the start permission waiting state. When the execution of the powertrain start processing is completed, the vehicle control device 60 turns on the preparation completion signal S1 (time point T8).

When recognition is made that the preparation completion signal S1 is turned on even though the midpoint learning processing is being executed, the reaction force control device 40 turns on the vehicle stop request signal S3 (time point T9). This is because the turn-on of the start permission signal S2 may be falsified by the third party impersonating the reaction force control device 40.

After the powertrain of the vehicle is started, the vehicle control device 60 executes predetermined processing when the turn-on of the vehicle stop request signal S3 is recognized. The predetermined processing is, for example, processing for stopping the operation of the powertrain. Accordingly, the vehicle is in an untravelable state. Further, the vehicle is suppressed to be maintained in the travelable state due to a fraudulent act, such as impersonation, even though the reaction force control device 40 is in the middle of executing the preparatory processing.

Effects of Present Embodiment

Therefore, according to the present embodiment, the following effects can be obtained. (1) When the vehicle power source is turned on, the reaction force control device 40 requests the vehicle control device 60 to stop the traveling of the vehicle when information is exchanged with the vehicle control device 60 in a manner that does not follow a predetermined pattern. The exchange of information includes, for example, the recognition of the turn-on of the start permission signal S2 by the vehicle control device 60 and the recognition of the turn-on of the preparation completion signal S1 by the reaction force control device 40. The predetermined pattern includes, for example, the turn-on of the start permission signal S2 by the reaction force control device 40 and then the turn-on of the preparation completion signal S1 by the vehicle control device 60 in response to the turn-on of the start permission signal S2. When this configuration is employed, there is a concern that the information exchanged between the reaction force control device 40 and the vehicle control device 60 may be falsified due to some kind of fraudulent act. In this respect, according to the present embodiment, when the information is exchanged between the reaction force control device 40 and the vehicle control device 60 in a manner that does not follow the predetermined pattern, it is possible to suppress the vehicle to travel. Therefore, crime prevention performance is further enhanced.

(2) When the preparatory processing for the reaction force control is completed, the reaction force control device 40 permits the vehicle control device 60 to cause the vehicle to transition to the travelable state. The transition of the vehicle to the travelable state is, for example, the start of the powertrain of the vehicle. The permission to the vehicle control device 60 is made, for example, by the turn-on of the start permission signal S2 by the reaction force control device 40. The vehicle control device 60 waits until the reaction force control device 40 permits the vehicle to transition to the travelable state and then causes the vehicle to transition to the travelable state. For this reason, the vehicle can solely travel after the preparatory processing of the reaction force control device 40 is completed. Therefore, it is possible for the driver to start the traveling of the vehicle in a safer state.

(3) when recognition is made that the vehicle is in the travelable state even though the reaction force control device 40 does not permit the vehicle control device 60 to cause the vehicle to transition to the travelable state, the permission to the vehicle control device 60 may be falsified due to the fraudulent act, such as impersonation. The falsification of the permission to the vehicle control device 60 is, for example, falsification of the turn-on of the start permission signal S2. The fact that the vehicle is in the travelable state can be recognized, for example, by the turn-on of the preparation completion signal S1. According to the present embodiment, when the permission to the vehicle control device 60 may be falsified, the vehicle control device 60 is requested to stop the traveling of the vehicle. The request to prohibit the vehicle from traveling is made by, for example, the turn-on of the vehicle stop request signal S3 by the reaction force control device 40. With the stop of the traveling of the vehicle by the vehicle control device 60 in response to the request from the reaction force control device 40, the crime prevention performance is enhanced.

(4) The preparatory processing of the reaction force control device 40 includes the midpoint learning processing and the rudder angle synchronization processing. For example, when the vehicle starts to travel even though the steering control device is in the middle of executing the midpoint learning processing or the rudder angle synchronization processing, the driver may have difficulty in steering the steering wheel 11 in an intended steering direction. This is because the steering wheel 11 automatically rotates during the execution of the midpoint learning processing or during the execution of the rudder angle synchronization processing. In this respect, according to the present embodiment, when the preparatory processing for the reaction force control is completed, the reaction force control device 40 permits the vehicle control device 60 to cause the vehicle to transition to the travelable state. For this reason, the vehicle can solely travel after the preparatory processing of the reaction force control device 40 is completed. Therefore, it is possible for the driver to start the traveling of the vehicle in a safer state. There is no sense of discomfort for the driver.

(5) The vehicle control device 60 controls the start of the powertrain including the drive source for traveling of the vehicle. Therefore, with the control of the start of the powertrain of the vehicle through the vehicle control device 60, it is possible to cause the vehicle to transition to the travelable state.

Other Embodiment

The present embodiment may be implemented with the following changes. The preparation completion signal S1, the start permission signal S2, and the vehicle stop request signal S3 may be flags.

In the present embodiment, the reaction force motor 21 and the turning motor 31 have two winding groups, but may have one winding group. In this case, the reaction force control device 40 may have solely any one of the first system circuit 41 or the second system circuit 42. Further, in this case, the turning control device 50 may have solely any one of the first system circuit 51 or the second system circuit 52. The first reaction force control circuit 41A or the second reaction force control circuit 42A corresponds to the reaction force control circuit. The first turning control circuit 51A or the second turning control circuit 52A corresponds to the turning control circuit.

What is claimed is:

1. A steering control device comprising a control circuit configured to control driving of a reaction force motor that generates steering reaction force applied to a steering wheel of a vehicle having a steer-by-wire steering system in which power transmission between the steering wheel and turning wheels of the vehicle is separated, wherein when a vehicle power source of the vehicle is turned on, the control circuit requests a vehicle control device of the vehicle that controls traveling of the vehicle to stop the traveling of the vehicle when the control circuit determines that information has been exchanged between the control circuit and the vehicle control device in a manner that does not follow a predetermined pattern.

2. The steering control device according to claim 1, wherein upon completion of execution of preparatory processing by the control circuit that is triggered to be executed at a time at which the vehicle power source is turned on, the control circuit (i) permits the vehicle control device to cause the vehicle to transition to a travelable state and (ii) transitions to a normal control state where reaction force control of causing the reaction force motor to generate the steering reaction force is executed when recognition is made via the vehicle control device that the vehicle is in the travelable state.

3. The steering control device according to claim 2, wherein when the recognition is made via the vehicle control device that the vehicle is in the travelable state even though the control circuit did not permit the vehicle control device to cause the vehicle to transition to the travelable state, the control circuit requests the vehicle control device to stop the traveling of the vehicle.

4. The steering control device according to claim 2, wherein the preparatory processing includes, on a premise that a steering range of the steering wheel is restricted to less than 360°, (1) midpoint learning processing of operating the steering wheel to a first operation end and then reversely operating the steering wheel to a second operation end for learning of a steering neutral position of the steering wheel and (2) rudder angle synchronization processing of correcting a rotational position of the steering wheel such that the rotational position of the steering wheel is a rotational position corresponding to a turning position of the turning wheels.

5. The steering control device according to claim 1, wherein the vehicle control device controls a start of a powertrain of the vehicle including a drive source for traveling of the vehicle.

6. The steering control device according to claim 1, wherein
the predetermined pattern is a pattern in which the control circuit sends a second signal to the vehicle control device before the vehicle control device sends a first signal to the control circuit.

7. The steering control device according to claim 6, wherein the first signal is a preparation completion signal indicating that the vehicle control device has caused the vehicle to transition to a travelable state, and the second signal is a start permission signal indicating that the control circuit permits the vehicle control device to cause the vehicle to transition to the travelable state.

8. The steering control device according to claim 6, wherein
the control circuit requests the vehicle control device to stop the traveling of the vehicle when the control circuit receives the first signal from the vehicle control device without the control circuit having first sent the second signal to the vehicle control device.

9. The steering control device according to claim 8, wherein the first signal is a preparation completion signal indicating that the vehicle control device has caused the vehicle to transition to a travelable state, and the second signal is a start permission signal indicating that the control circuit permits the vehicle control device to cause the vehicle to transition to the travelable state.

* * * * *